Sept. 25, 1956 L. W. HAMPTON 2,764,329

LOAD CARRYING ATTACHMENT FOR BICYCLES, MOTORCYCLES, AND THE LIKE

Filed March 10, 1952

LUCIAN W. HAMPTON
INVENTOR.

BY
ATT'Y

United States Patent Office 2,764,329
Patented Sept. 25, 1956

2,764,329
LOAD CARRYING ATTACHMENT FOR BICYCLES, MOTORCYCLES, AND THE LIKE

Lucian W. Hampton, Portland, Oreg.

Application March 10, 1952, Serial No. 275,827

1 Claim. (Cl. 224—41)

This invention relates to improvements in load-carrying attachments for bicycles, motorcycles, and the like, and more particularly to carriers for loaded paper bags as used by paper delivery boys.

It is one of the principal objects of the invention to provide an attachment of this character, made of three parts, removably attachable to the handlebars of a bicycle or the like, and whereby a loaded bag may be readily secured thereto and held in a balanced position with respect to the bicycle and whereby the empty bag may be conveniently removed from the bicycle.

A further object of the invention is the provision of a carrier of this character which will maintain the load directly above, and distribute the same on both sides of, the center line or axle of the front wheel of the bicycle, or other vehicle to which it is attached.

These and other objects will appear as my invention is more fully hereinafter described in the following specification, illustrated in the accompanying drawing, and finally pointed out in the appended claim.

Figure 1:
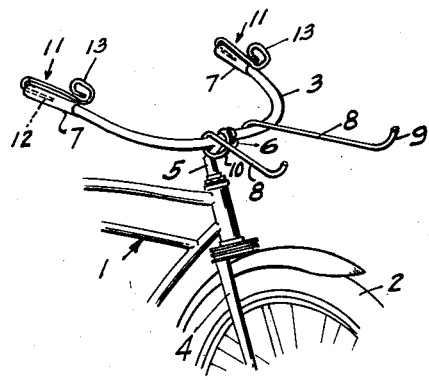
Figure 1 is a perspective fragmentary view of the forward end of a bicycle, showing applied thereto, a carrier made in accordance with my invention.
Figure 2:
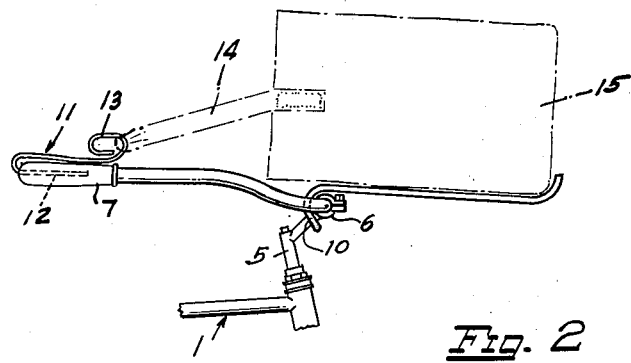
Figure 2 is a slightly enlarged side elevation of Figure 1.

Referring now more particularly to the drawing:

In Figure 1, reference numeral 1 indicates generally, the frame of a conventional bicycle whose front wheel 2 is connected to and operated in the conventional manner, by handlebars 3 by means of a fork 4 and steering column 5 to which the handlebar is secured in the conventional manner as indicated at 6. It is to be understood, of course, that the handlebars which are provided with handgrips 7 may be of any conventional curvature or design, and I therefore do not wish to be limited to the shape of handlebar shown.

The invention comprises a support extending forwardly from the handlebars 3 and consists of a rod formed into forwardly diverging arms 8 curved upwardly as at 9 at their forward ends and looped backwardly on themselves at their center sections, as shown, to overlie the top of the handlebar and to forwardly surround the steering column 5 as shown at 10 in Figure 1. The supporting arms 8 may be made of material of any desired stiffness to support a predetermined load.

Cooperating with the supporting rods 8 are two hook members generally indicated at 11. Each hook member is turned back on itself at its rearward end to form a portion 12 adapted to be inserted within the hollow hand-grip 7 and into the hollow end of the handlebar to which the grips are attached. The front end of each hook 11 is looped back on itself as shown, to provide a hook portion 13 somewhat in the form of a split ring within which the ordinary strap 14 of a conventional carrying bag 15 may be removably secured. By this arrangement, a paper carrier may deposit a fully loaded paper bag upon the supporting rods 8 and then attach the carrying strap 14 to the hooks 13 in substantially the manner shown. The supporting rods 8 being unsupported at their outer ends will, of course, deflect downwardly in accordance with a load imposed upon them and will also swing upwardly and downwardly to various degrees according to irregularities in the road surface over which the vehicle is traveling. As the rods are deflected downwardly, the loaded paper bag 15, will tilt downwardly with them. This tilting of the bag puts the straps 14 under increased tension and being connected to the hooks 11, will maintain the hooks in secure engagement with the handlebars or handgrips and prevent the rods 8 from deflecting downwardly excessively. The particular shape of the hook portion 13 which is substantially a split ring, prevents its disengagement from the strap 14 during any forward or rearward shifting of the load, since the strap must first be flattened and passed through the split in the hook portion 13 to disengage it.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

In a two-wheeled vehicle having hollow tubular handle-bars provided with hand-grips at the ends thereof and a load support attached to and extending forwardly from the center section of said handle-bars, a pair of hook members each comprising a horizontal portion for insertion through the outer end of a hand-grip and into its respective end of the hollow tubular handle-bar, said horizontal portion of each hook being turned back and forwardly on itself then looped back at its forward end into a split ring adapted for attachment to a load carried by the load support whereby downward deflection of the support under a load will apply forward tension to said hook members to hold them in firm engagement with their respective hand-grips and the ends of the hollow tubular handle-bars.

References Cited in the file of this patent

UNITED STATES PATENTS

| 637,762 | Buley | Nov. 28, 1899 |
| 665,255 | McCabe | Jan. 1, 1901 |
| 1,280,030 | Hill | Sept. 24, 1918 |
| 1,361,624 | Schmidt | Dec. 7, 1920 |
| 1,400,758 | Mansfield | Dec. 20, 1921 |
| 1,965,091 | Wintrob | July 3, 1934 |
| 2,454,732 | Cathey | Nov. 23, 1948 |

FOREIGN PATENTS

| 49,665 | Denmark | Dec. 5, 1934 |